United States Patent [19]

Livesay

[11] 4,361,363
[45] Nov. 30, 1982

[54] IDLER-ROLLER RECOIL DEVICE

[75] Inventor: Richard E. Livesay, Peoria, Ill.

[73] Assignee: Caterpillar Tractor Co., Peoria, Ill.

[21] Appl. No.: 273,879

[22] PCT Filed: Nov. 19, 1980

[86] PCT No.: PCT/US80/01550
 § 371 Date: Nov. 19, 1980
 § 102(e) Date: Nov. 19, 1980

[87] PCT Pub. No.: WO82/01693
 PCT Pub. Date: May 27, 1982

[51] Int. Cl.³ .............................................. B67D 55/10
[52] U.S. Cl. ...................................... 305/22; 305/28;
 305/31; 474/134; 474/135
[58] Field of Search .................... 474/111, 134, 135;
 305/22, 27, 28, 31, 21; 180/9.2 R

[56] References Cited

U.S. PATENT DOCUMENTS

| 2,315,421 | 3/1943 | Heaslet | 305/9 |
|---|---|---|---|
| 3,332,725 | 7/1967 | Reinsma | 305/31 X |
| 3,768,878 | 10/1973 | Garman | 305/31 |
| 3,826,325 | 6/1974 | Purcell et al. | 305/22 X |
| 3,841,424 | 10/1974 | Purcell et al. | 180/9.5 |
| 3,901,563 | 8/1975 | Day | 305/10 |
| 3,938,606 | 2/1976 | Yancey | 180/9.5 |

FOREIGN PATENT DOCUMENTS

| 842682 | 6/1939 | France | 305/22 |
|---|---|---|---|
| 101897 | 5/1963 | Norway | 305/22 |
| 409225 | 4/1934 | United Kingdom | 305/22 |
| 611543 | 11/1948 | United Kingdom | 305/22 |

*Primary Examiner*—David A. Scherbel
*Attorney, Agent, or Firm*—Richard F. Phillips

[57] ABSTRACT

An idler recoil device (10) is utilized for track-type vehicles. The idler recoil device (10) protects a crawler track system (11) from damage when some foreign object, such as a rock, is trapped between an endless chain link assembly (28) and a chain supporting element (20,22,24,26) of the crawler track system (11). An idler link (30) is pivotally connected to a track frame (12) of the crawler track system (11) and a recoilable rear idler (24) is rotatably positioned on an idler hub (54) itself pivotally connected to said idler link (30). An increase in tension on said endless chain link assembly (28) causes said idler hub (54) to rotate away from said endless chain link assembly (28) decreasing track path length and, consequently, tension. This rotation is resiliently resisted by a recoil pad (66) mounted between said idler hub (54) and said idler link (30). A tensile link (68) prevents any recoil up to a preselected endless chain link assembly (28) tension.

18 Claims, 5 Drawing Figures

IDLER-ROLLER RECOIL DEVICE

DESCRIPTION

1. Technical Field

This invention relates generally to crawler track assemblies for track-type vehicles and more particularly to idler recoil devices for crawler track assemblies.

2. Background Art

A great problem faced by those who design crawler track roller frames relates to the near certainty that foreign objects, such as tree limbs and rocks, will be drawn between an idler, roller or drive sprocket of the crawler track assembly and the corresponding endless chain link assembly. This causes an increase in the effective path length for the endless chain link assembly which places the substantially inelastic chain link assembly in increased tension occasionally resulting in damage. If the position of each idler and sprocket which guide and support the track chain is perfectly fixed any foreign object trapped between the endless chain link assembly and a corresponding idler, roller or drive sprocket will result in the occurrence of one of the following three events: (1) the foreign object will be sufficiently small that the increase in endless chain link assembly length it causes is less than the slack available in the endless chain; (2) the foreign object will be crushed until it is sufficiently small to cause an increase in path length less than the available slack; or (3) the foreign object will not be sufficiently small or sufficiently crushed and the resulting strain on the endless track chain link assembly will either damage the endless track chain assembly or some part of the frame.

A related problem is that track-type vehicles, being frequently used on rough terrain, are apt to run up against obstacles with the front and the back of their crawler tracks. This can place a tremendous compressional or shear loading on the components of the roller frame, most typically an idler, in contact with the point of impact and the associated portion of the frame. If this transient loading is not in some way dampened, the structural parts subjected to this loading will be required to be of significantly greater strength and, consequently, of greater cost than would otherwise be necessary.

The most commonly attempted solution to these difficulties has been to resiliently mount the fore and/or aft idlers. Typical are the fluid shock absorber systems of Purcell et al in U.S. Pat. No. 3,841,424 issued Oct. 15, 1974; the torsion bar shock absorber system of Garman described in U.S. Pat. No. 3,768,878 issued Oct. 30, 1973; the ribbon spring shock absorber system of Heaslet set forth in U.S. Pat. No. 2,315,421 issued on Mar. 30, 1943; and the coil spring system used by Meisel as described in U.S. Pat. No. 4,149,757 issued Apr. 17, 1979. Yet another solution, utilizing a compressible pad, is set forth in U.S. Pat. No. 3,938,606 to Yancey, issued Feb. 17, 1976.

While all of the aforementioned schemes are to some extent effective, a recoil device of reduced weight, complexity, and cost and of greater mechanical advantage, with simpler maintenance requirements would be further advantageous.

The present invention is directed to overcoming one or more of the problems as set forth above.

DISCLOSURE OF THE INVENTION

In one aspect of the present invention, a roller frame of a crawler track-type vehicle has an idler recoil device with an idler connected to a link which itself is pivotally connected by a central point thereon to one end of the roller frame. The idler is rotatably connected to said idler link and is outwardly biased by a compressible pad in such a manner that the idler moves inward so as to relieve endless track chain assembly tension once the tension reaches some preselected minimum value. The recoilable idler also has shock absorbing capabilities to mitigate the effects of transient ground loadings and functions in a load sharing manner with an adjacent roller assembly.

BEST MODE FOR CARRYING OUT THE INVENTION

Figure 1:
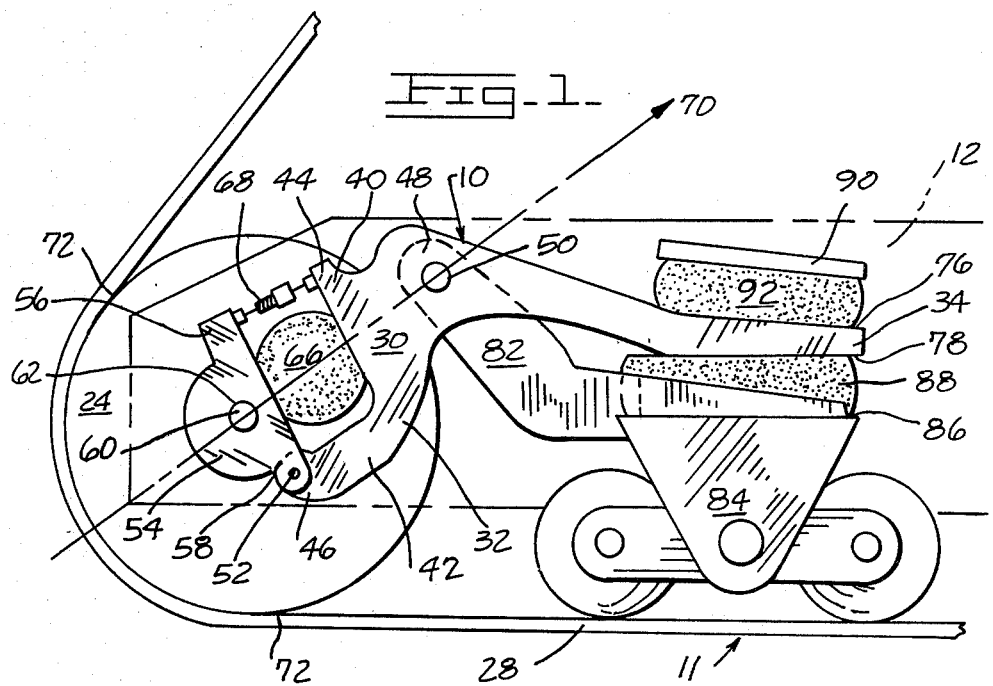
FIG. 1 is a diagrammatic side elevational view of an embodiment of the present invention.

Referring to the drawings, an idler recoil device embodying the principles of the present invention, is generally indicated by the reference numeral 10. The recoil device 10 is utilized on a crawler track system 11 having a frame 12 with fore, aft and center portions 14,16,18; a front idler 20 rotatably mounted on the roller frame fore portion 14; a plurality of track roller assemblies 22 mounted along the bottom of the frame 12; a rear idler 24 rotatably mounted on the roller frame aft portion 16; a drive sprocket 26; and, an endless track chain assembly 28 trained about the idlers 20,24, roller assemblies 22 and drive sprockets 26.

Figure 2:
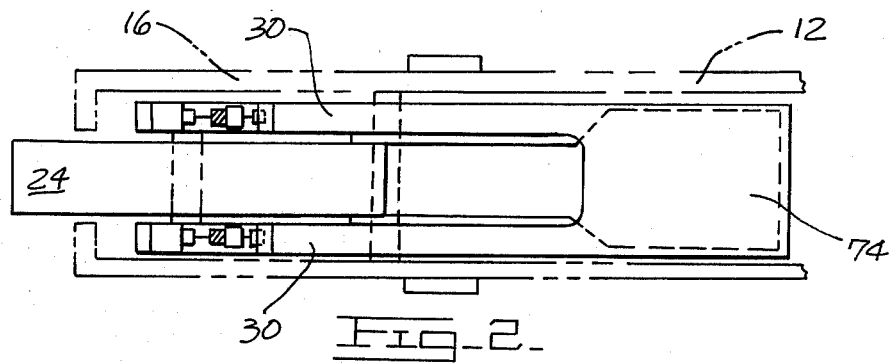
FIG. 2 is a partial diagrammatic top plan view corresponding to FIG. 1 with the endless track chain assembly deleted for the purpose of clarity.
Figure 3:
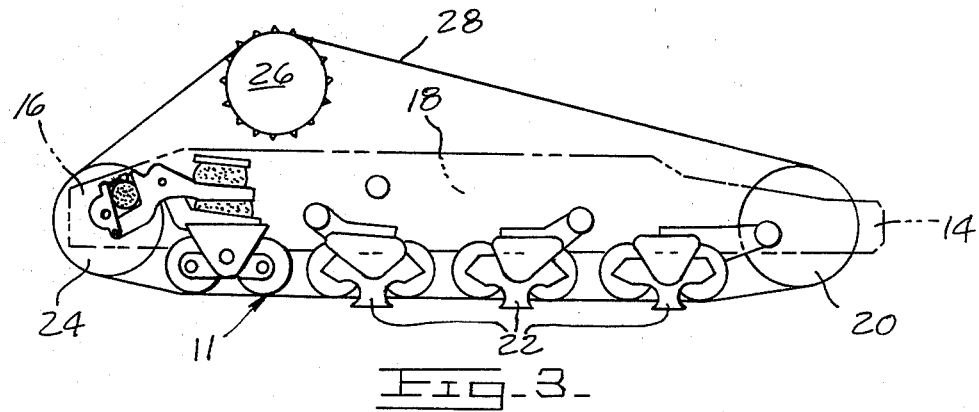
FIG. 3 shows an embodiment of the present invention corresponding to FIG. 1 as it is incorporated into a track roller frame.

In the preferred embodiment, the present invention is utilized to recoilably mount the rear idler 24 of the previously detailed crawler track system 11. With changes obvious to one skilled in the art it could, however, be used for recoilably mounting the front idler 20. It is envisioned that each of the two crawler track systems 11 of a crawler-type vehicle will identically incorporate the described idler recoil device 10 of the present invention. As shown in FIG. 2, each element of the best mode of present invention is substantially duplicated about a vertical plane passing through the longitudinal axis of the crawler track system 11 which incorporates it. For the sake of brevity, only the outboard portion of the idler recoil device 10 will be detailed in much of the following description.

As best shown in FIG. 1 the idler recoil device 10 includes an idler link 30 having first and second ends 32,34. The first end 32 of the idler link 30 is forked having an upper first extension 40 and a second extension 42 which, respectively, have free end portions 44,46. In the preferred embodiment these extensions 40,42 are substantially perpendicular one to the other. The idler link 30 has a center portion 48 by which it is pivotally attached by a track frame pin 50 to the track frame 12 for motion about a horizontal axis perpendicular to the longitudinal axis of the track frame 12 (unless otherwise specified all pivots referred to henceforth will have axes parallel to that of the roller-idler pin 50). The idler link 30 is positioned so that its second end 34 is nearest the track frame center portion 18.

Pivotally attached by a recoil pin 52 to the lower extension free end portion 46 is an idler hub 54 having a free end portion 56 and a pivot end 58 through which the recoil pin 52 passes. An idler axle 60 for mounting the rear idler 24 is supported by the idler hub 54 and is located thereon at a hub axle point 62 located a spaced distance from said recoil pin 52. A recoil pad 66 made of rubber or some other elastomeric material, preferably at least several inches thick, is situated between the idler hub 54 and the idler link upper fork 40. The relevant members are so positioned, as shown in FIG. 1, that movement of the recoilable idler 24 toward the track frame center portion 18 causes the idler hub 54 to squeeze the recoil pad 66 against the idler upper fork 40.

Joining the upper first extension free end portion 44 and the idler hub free end portion 56 is a tensile link 68. This tensile link 68 is preferably a turnbuckle but can assume any configuration which serves the purpose of drawing the upper extension free end 44 toward its respective idler hub free end portion 56 so as to maintain the recoil pad 66 in a state of constant preselected compression. It is advantageous if the tensile link 68 is so constructed that its tension is readily adjustable. Additionally, a maximum compression stop (not shown) may be provided. This may be a feature of the tensile link 68 which prevents compression of the tensile link 68 more than a preselected amount or may be a mechanical bar or stop on the track frame 12 or the idler link 30 restricting the extent of pivotability of the idler hub 54.

In the preferred embodiment of the idler recoil device 10 the longitudinal axes of the idler link upper extension 40 and the idler hub 54 are substantially parallel. Preferably, both are also substantially perpendicular to a bisector line 70 formed by bisecting the angle formed by the tangents to the recoilable idler 24 at the track-recoilable idler contact boundaries 72.

The idler link second end 34 extends substantially horizontally away from the idler link center portion 48. At a distance toward the idler link second end 34 from the idler link center portion 48 begins an idler link crossmember 74 rigidly joining the inboard and outboard idler links 30 together. This idler link crossmember 74 is preferably a horizontal flat member extending to the outermost boundary of the idler link second end 34 and has upper and lower faces 76,78. The crossmember 74 can be integral with the inboard and outboard idler links 30.

Pivotally attached to the track frame pin 50 and situated between the inboard and outboard idler link halves 30 also pivotally attached thereto is a roller assembly link 82. The roller assembly link 82 extends beneath the idler link second end 34 and toward the track frame center portion 18. Depending from this roller assembly link 82 is a roller assembly 84 having a generally flat upper surface 86. In the preferred embodiment of this invention, the roller assembly 84 is a bogied roller pair. Situated between the crossmember lower face 78 and the roller assembly upper surface 86 and rigidly attached to the latter is a lower suspension pad 88 made of rubber or a like material for resiliently resisting downward movement of the idler link second end 34 and upper movement of the roller assembly 84.

Fixedly attached to the track frame 12 and positioned a spaced vertical distance above and substantially parallel to the crossmember upper face 76 is a stop member 90. Attached to the stop member 90 is a resilient stop pad 92 made of rubber or the like for resiliently resisting upward movement of the idler link second end 34. Preferably, this pad is sufficiently thick, preferably several inches, so as to permit a substantial upward force acting on the roller assembly 84 to result in appreciable upward movement of the idler link second end 34.

The orientation and design of the individual members of the idler recoil device 10 must be such that in steady state operation (that is, the track neither accelerating nor decelerating and operating on a flat, level surface), the lower suspension pad 88 and the stop pad 92 are in compression and the recoilable idler 24 bears no weight yet is able to do so in a load sharing manner should the roller assembly 84 be unduly loaded or should the recoilable idler 24 pass over a bump. The preferred location for the roller-idler pin 50 is at a point on the track frame 12 about which upward rotation of the first end of the idler link 30 from its steady state position will result in neither a substantial increase nor substantial decrease in the track 28 path length and, consequently, in the track 28 tension. One skilled in the art could readily determine this position for a given crawler track system. It is further advantageous to place the roller-idler pin 50 on the bisector 70.

It should be understood that the configuration of the crawler track 10 with idler recoil device described above is only a preferred embodiment. The invention can be of other configurations without departing from the claims set forth hereafter.

Industrial Applicability

In the operation of a crawler track vehicle the inclusion of an idler recoil device 10 is of great advantage. When the endless chain assembly 28 tension increases due to, for example, a rock 94 passing between the chain 28 and an idler 24 this tension increase will generally exist uniformly at every point along the entire track 28. This will result in a load being placed on every chain supporting member 20,22,24,26 about which the chain 28 has a change in direction. This load is equal to the vector sum of the tack tension load vectors at the boundaries of track-supporting member contact (e.g. points 72 for the recoilable idler 24).

Figure 4:
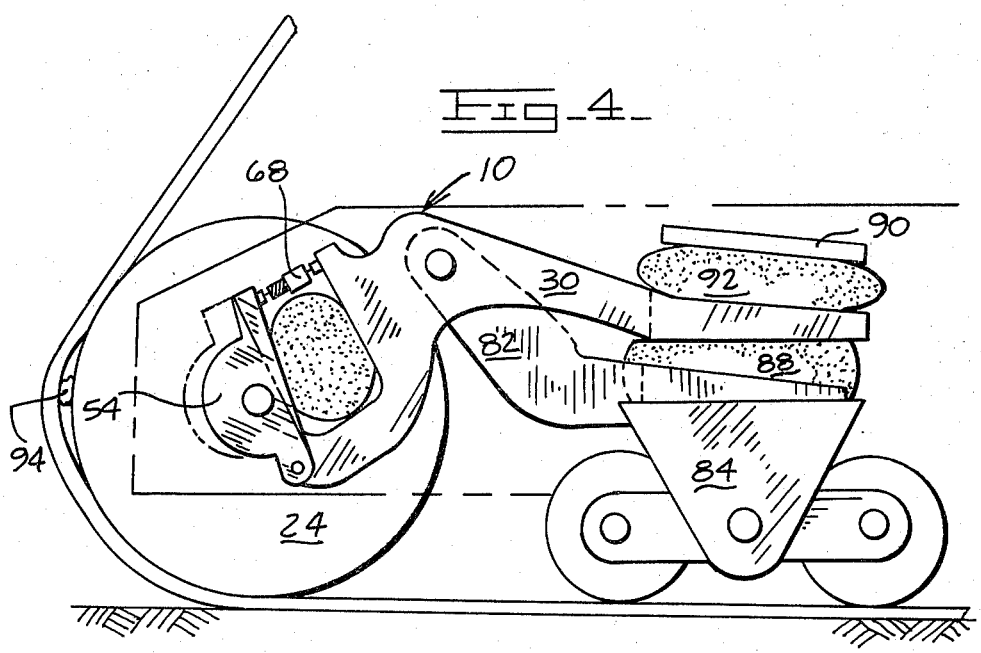
FIG. 4 shows the action of an embodiment of the present invention corresponding to FIG. 1 when a rock passes between the track and the recoilable idler, the static hub position being shown in phantom outline.

For the case of a recoilable idler, which is the rear idler 24 in the described embodiment, the loading is along the bisector 70 of the two tangents to the recoilable idler 24 at the bounds of the track-recoilable idler contact 72. This bisector loading passing through the recoilable idler axle 60 and tends to force the recoilable idler 24 along the bisector 70 toward the track frame center portion 18. However, since the recoilable idler axle 60 is borne by an idler hub 54 which is connected to the idler link 30 by a pivot, the recoil pin 52, not on the bisector 70 (that is, the line along which the force effectively acts) a moment is created tending to rotate the idler hub 54 to a position nearer the track frame center portion 18. This is shown in FIG. 4. This rotation is resiliently resisted by the recoil pad 66 positioned between the idler hub 54 and the idler axle 60. It is this rotation of the idler hub 54 and the idler axle 60 which it supports toward the idler link upper extension 40 that causes the length of the path that the endless track chain assembly 28 must follow to decrease thereby lessening the tension on the track 28. It is in this manner the present invention allows recoil and hence prevents damage to the chain assembly 28.

The tensile link 68 is an advantageous but not indispensible feature of the present invention. In the operation of the track 28 the recoilable idler 24 will constantly hit bumps and other increases in ground elevation which in the absence of the tensile link 68 would cause periodic compression of the recoil pad 66 and consequent small decreases in endless track chain 28 path length in the absence of high track tension. Such frequent, unnecessary fluctuations in track tension could cause undue wear of the chain 28, the recoil pad 66, and other portions of the crawler track system 11. Through use of a tensile link 68, however, the recoil pad 66 is maintained in a state of constant compression so that only sufficiently great increases in track tension and substantial shocks can cause any recoil. Only when the compressional force on the recoil pad 66 due to either track tension or shock exceeds the steady state compressional force on the recoil pad 66 due to the loading imposed by the tensile link 68 can any compression of the recoil pad 66 take place. In the preferred embodiment, the tensile link 68 can be adjusted to supply a preselected compressional loading such that the track tension at which recoil occurs can be varied. In addition, it is important that the tensile link 68 be so designed that it is incapable of bearing a compressional loading as a result of movement of the idler hub free end 56 toward the upper fork free end 44. Several methods of achieving this are well known in the art. As previously mentioned, some means of limiting pivotability of the idler hub 54 is desirable. This would serve to prevent over stressing the recoil pad 66.

Figure 5:
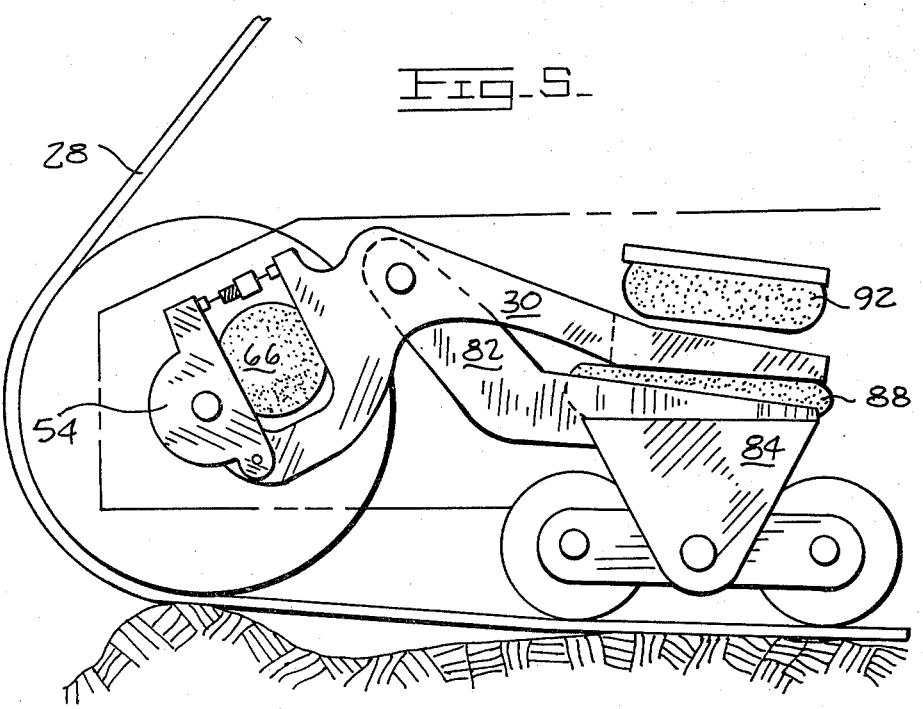
FIG. 5 shows load transferance by an embodiment of the present invention corresponding to FIG. 4, at an instance when the rear idler is greatly loaded.

The present invention achieves idler recoil at no sacrifice in the shock absorbing capabilities of a conventional soft suspension. Upward forces on the recoilable idler 24 cause the idler link 30 to pivot about the roller-idler pin 50 resulting in simultaneous compression of the lower suspension pad 88 and partial load transfer to the underlying rear roller assembly 84. This is shown in FIG. 5. Conversely, an upward load on the rear roller assembly 84 causes compression of both the lower suspension pad 88 and the stop pad 92 and downward rotation of the idler link first end portion 32 resulting in, depending on ground configuration, some load transfer to the rear idler 24.

Maintenance of as constant a level of track tension as is possible, being one of the principal objects of the present invention, is enhanced by the positioning of the track frame pin 50. With this pin 50 positioned as set forth previously, the upward movement of the recoilable idler 24 and consequent compression of the lower suspension pad 88 necessary for shock absorbance occurs with a minimum change in tension of the endless track chain assembly 28.

This combination of recoil only for sufficiently great loading, recoil adjustability, shock absorbance without substantial change in track tension, and load transferability all yielded by a device of simplicity and efficiency are indicative of the practicality and value of the present inventions.

Other aspects, objects, advantages, and uses of this invention can be obtained from a study of the drawings, the disclosure and the appended claims. It should be understood that the crawler track with idler recoil device can assume many other configurations without departing from the claims.

I claim:

1. An idler recoil device (10) adapted for use in a crawler track system (11) having a track frame (12), comprising:

an idler link (30) having a first end portion (32), a center portion (48), and a second end portion (34), the first end portion (32) being bifurcated to form a first extension (40) and a second extension (42), said idler link (30) being pivotally connected to said track frame (12);

an idler hub (54) pivotally connected to said second extension (42);

an idler (24) rotatively mounted on said idler hub (54);

first resilient means (66) for biasing said idler (24) outwardly from said first extension (40), said first resilient means (66) being positioned between said first extension (40) and said idler hub (54);

second resilient means (90,92) for resiliently resisting upward movement of the idler link second end (34); and third resilient means (82,84,88) for resiliently resisting downward movement of the idler link second end (34).

2. The idler recoil device (10) of claim 1 further comprising a roller assembly link (82) pivotally connected to the track frame (12) and extending in a direction away from said idler link first end portion (32) and being substantially beneath said idler link second end portion (34), there being a roller assembly (84) connected to said roller assembly link (82), and wherein said third resilient means (82,84,88) includes an elastomeric element (88) positioned between the idler link second end portion (34) and said roller assembly (84).

3. An idler recoil and track support device (10) adapted for use in a crawler track system (11) having a track roller frame (12), comprising:

an idler link (30) having a first end portion (32), a center portion (48) and a second end portion (34), said idler link (30) being pivotally connected to said track roller frame (12) by a pin (50);

an idler hub (54) pivotally connected to said idler link first end portion (32);

an idler axle (60) connected to said idler hub (54);

an idler (24) connected to said idler axle (60) and being rotatable relative to said idler hub (54);

means (66) for biasing said idler hub (54) for rotation away from said idler link pin (50) such that said idler (24) is outwardly biased from said idler link (30); and means (82,84,88) for resiliently resisting upward rotation of said idler link first end portion (32).

4. The idler recoil and track support device (10), as set forth in claim 3, wherein said pin (50) is positioned at said idler link center portion (48).

5. The idler recoil and track support device (10), as set forth in claim 4, wherein said means (82,84,88) for resiliently resisting upward rotation of said idler link first end portion (32) includes: a roller assembly link (82) pivotally connected to the track frame (12); a roller assembly (84) attached to said roller assembly link (82); said roller assembly (84) being positioned substantially beneath said idler link second end portion (34); and, a resilient element (88) interposed between said idler link second end portion (34) and said roller assembly (82).

6. The idler recoil and track support device (10), as set forth in claim 5, further including means (90,92) for resiliently resisting upward rotation of said idler link second end portion (34).

7. An idler recoil device (10) adapted for use in a crawler track system (11) having a frame (12), comprising:
- an idler link (30) having a first end portion (32), a second end portion (34) and a center portion (48), the first end portion (32) having a first extension (40) and a second extension (42), said idler link (30) being pivotably connected to said frame (12) by a track frame pin (50) passing through said idler link center portion (48);
- an idler hub (54) pivotally connected to said second extension (42);
- an idler (20,24) rotatively connected to said idler hub (54);
- first means (66) for biasing said idler hub (54) away from said first extension (40); and
- a roller assembly link (82) pivotally connected to said frame (12) and extending generally beneath said idler link second end portion (34), said roller assembly link (82) and said idler link second end portion (34) being in force transmitting relationship one to the other.

8. The idler recoil device (10) of claim 7 further comprising a resilient element (88) positioned intermediate said roller assembly link (82) and said idler link second end portion (32).

9. The idler recoil device (10) of claim 7 or claim 8 further comprising a stop member (90) rigidly connected to said frame (12) at a position substantially above said idler link second end portion.

10. The idler recoil device (10) of claim 9 further comprising a resilient mens (92) interposed between said stop member (90) and said idler link second end portion (34).

11. In a crawler track system (11) having:
- a track frame (12) having a fore portion (14), an aft portion (16) and a center portion (18);
- at least one track roller assembly (22) connected to said track frame (12);
- an idler (20/24) connected to the track frame (12); and
- an endless track assembly (28) adapted to be driven by a drive sprocket (26), said endless track assembly (28) being trained about said idler (20/24), said drive sprocket (26) and said track roller assembly (22), the improvement comprising:
- an idler link (30) pivotally connected to said track frame (12), said idler link (30) having a first end portion (32), a center portion (48), and a second end portion (34), the first end portion (32) being bifurcated to form a first extension (40) and a second extension (42);
- an idler hub (54) pivotally connected to said second extension (42);
- an idler axle (60) mounted on said idler hub (54);
- said idler (20/24) being rotatively mounted on said idler axle (60); and
- first resilient means (66) positioned between said first extension (40) and said idler hub (54) for permitting recoil of said idler (20/24).

12. The crawler track system (11), as set forth in claim 11, further including means (82,84,88) for resiliently resisting upward movement of said idler link first end portion (32).

13. The crawler track system (11), as set forth in claim 11, further including means (90,92) for resiliently resisting downward movement of said idler link first end portion (32).

14. The crawler track system (11), as set forth in claim 13, further including a pivot pin (50), said pivot pin (50) being mounted on said track frame (12), said idler link (30) being connected to said pivot pin (50) at said idler link center portion (48).

15. The crawler track system, as set forth in claim 14, wherein said downward movement resisting means (90,92) includes a stop (90) connected to said frame (12), said stop (90,92) being positioned above said idler link second end portion (34).

16. The crawler track system, as set forth in claim 15, further including a roller assembly link (82) pivotally connected to said track frame (12), said roller assembly link (82) having a roller assembly (84) attached thereto, said roller assembly (84) being substantially beneath said idler link second end portion (34).

17. The crawler track system, as set forth in claim 16, further including a resilient element (88) interposed intermediate said idler link second end portion (34) and said roller assembly (82).

18. The crawler track system, as set forth in claim 14, wherein said track assembly (28) and idler (20/24) define two bounds of track-idler contact (72), said bounds of track-idler contact (72) defining two tangents to said idler (20/24) at said bounds of track-idler contact (72), there being a bisector (70) of said tangents, said idler axle (60) and said pivot pin (50) both being positioned such that said bisector (70) passes substantially through said idler axle (60) and said pivot pin (50).

* * * * *